US012693658B2

(12) United States Patent
Sun et al.

(10) Patent No.:  US 12,693,658 B2
(45) Date of Patent:  Jul. 28, 2026

(54) RUNTIME DATA COLLECTION AND MONITORING IN MACHINE LEARNING SYSTEMS

(71) Applicant: Tektronix, Inc., Beaverton, OR (US)

(72) Inventors: Wenzheng Sun, Mississauga (CA); Evan Douglas Smith, Portland, OR (US); John J. Pickerd, Hillsboro, OR (US)

(73) Assignee: Tektronix, Inc., Beaverton, OR (US)

( * ) Notice: Subject to any disclaimer, the term of this patent is extended or adjusted under 35 U.S.C. 154(b) by 425 days.

(21) Appl. No.: 18/353,844

(22) Filed: Jul. 17, 2023

(65) Prior Publication Data

US 2024/0028002 A1     Jan. 25, 2024

Related U.S. Application Data

(60) Provisional application No. 63/406,644, filed on Sep. 14, 2022, provisional application No. 63/391,269, filed on Jul. 21, 2022.

(51) Int. Cl.
G05B 19/418          (2006.01)

(52) U.S. Cl.
CPC ...  G05B 19/4183 (2013.01); G05B 19/41885 (2013.01)

(58) Field of Classification Search
USPC ......................................................... 700/108
See application file for complete search history.

(56) References Cited

U.S. PATENT DOCUMENTS

| | | | | |
|---|---|---|---|---|
| 8,533,136 B1 * | 9/2013 | Xu | ......................... | G06F 30/367 |
| | | | | 706/45 |
| 11,157,812 B2 | 10/2021 | McCourt et al. | | |
| 11,329,861 B2 | 5/2022 | Busbee et al. | | |
| 11,347,845 B2 | 5/2022 | Kursun | | |
| 11,354,602 B2 | 6/2022 | Kursun | | |
| 2004/0098215 A1 * | 5/2004 | Gee | ......................... | G06F 30/367 |
| | | | | 702/109 |

(Continued)

FOREIGN PATENT DOCUMENTS

DE      102008053203 A1 *  6/2009

OTHER PUBLICATIONS

DE_102024119378_A1 (Year: 2025).*

*Primary Examiner* — Hien D Khuu
(74) *Attorney, Agent, or Firm* — Miller Nash LLP; Andrew J. Harrington

(57)                ABSTRACT

A test and measurement system includes a test and measurement instrument configured to receive waveform data from a device under test (DUT) on a manufacturing line, a machine learning system connected to the test and measurement instrument, and one or more processors configured to execute code that causes the one or more processors to: collect optimal tuning parameter data sets from the DUT after the DUT is tuned on the manufacturing line, determine one or more parameter data sets from the optimal tuning parameter data, load the one or more parameter data sets into the DUT, collect waveform data from the DUT for the one or more parameter data sets as training data sets, train the machine learning system using the training data sets, and use the machine learning system after training to produce an output related to the DUT.

15 Claims, 8 Drawing Sheets

(56) References Cited

U.S. PATENT DOCUMENTS

| | | | |
|---|---|---|---|
| 2009/0105992 A1* | 4/2009 | Jones | H03M 1/109 |
| | | | 702/187 |
| 2019/0123988 A1* | 4/2019 | Leverich | H04L 41/0686 |
| 2020/0372402 A1 | 11/2020 | Kursun et al. | |
| 2021/0133632 A1 | 5/2021 | Elprin et al. | |
| 2021/0267488 A1 | 9/2021 | Taghvaeeyan et al. | |
| 2021/0403004 A1 | 12/2021 | Alvarez et al. | |
| 2021/0406726 A1* | 12/2021 | Khatami | G06N 3/0442 |
| 2022/0011733 A1* | 1/2022 | Feilen | G06N 3/02 |
| 2022/0083545 A1* | 3/2022 | Joyner | G06F 16/212 |
| 2022/0093242 A1 | 3/2022 | Hakala et al. | |
| 2022/0137091 A1* | 5/2022 | Bartlett | G01R 31/2601 |
| | | | 324/762.01 |
| 2022/0238216 A1 | 7/2022 | Shelton, IV et al. | |
| 2022/0247648 A1 | 8/2022 | Pickerd et al. | |
| 2022/0273204 A1 | 9/2022 | Kamath et al. | |
| 2022/0309391 A1 | 9/2022 | Patel et al. | |
| 2022/0311513 A1* | 9/2022 | Pickerd | H04B 10/40 |
| 2022/0341990 A1* | 10/2022 | Moreno | H04L 9/3278 |
| 2022/0373598 A1 | 11/2022 | Tan et al. | |
| 2023/0185274 A1* | 6/2023 | Asadi-Zanjani | G06F 30/398 |
| | | | 700/98 |
| 2024/0068952 A1* | 2/2024 | Doros | G01N 21/8851 |
| 2024/0235669 A1* | 7/2024 | Pickerd | H04B 10/0731 |
| 2024/0353491 A1* | 10/2024 | Pickerd | G01R 31/2874 |

* cited by examiner

RUNTIME DATA COLLECTION AND MONITORING IN MACHINE LEARNING SYSTEMS

CROSS-REFERENCE TO RELATED APPLICATIONS

This disclosure claims benefit of U.S. Provisional Application No. 63/391,269, titled "LIVE LISTENER FOR DATA COLLECTION MONITORING," filed on Jul. 21, 2022, and U.S. Provisional Application No. 63/406,644, titled RUNTIME TRAINING DATA COLLECTION FOR MACHINE-LEARNING-BASED TUNING SYSTEM, filed on Sep. 14, 2022, the disclosures of both of which are incorporated herein by reference in their entireties.

TECHNICAL FIELD

This disclosure relates to test and measurement systems, and more particularly to machine learning modules and algorithms for use in a test and measurement system.

BACKGROUND

Machine learning (ML) algorithms require obtaining large amounts of data to train and validate the algorithm/ network. The amount of data required is often so huge that it becomes a burden for customers to collect, and whatever data can be acquired from customers is often not comprehensive enough to train a robust ML algorithm. Additionally, the physical task of instructing a customer to collect the correct data can cause frustration and delays. It is common that the operator performing the data collection is removing himself from performing daily tasks to get accurate data for outside companies meaning there will always be the pressure to return to normal work as promptly as possible.

DETAILED DESCRIPTION

The embodiments here perform a collection of waveform data and metadata for training a deep learning network for tuning and validation of devices under test (DUT). The examples discussed below relate to the tuning and validation of optical transmitters but apply to other types of electronic devices. The embodiments achieve the collection of waveform data with minimal slowdown of existing manufacturing lines and avoid having to shut down the line completely. The embodiments may notify a user when the system has collected enough data to allow training of a machine learning system so that the machine learning system can predict optimal tuning parameters and validation of performance measurements. The embodiments also allow the system to revert to conventional tuning processes for gathering additional training data, or other issues. The embodiments may also gather and calculate statistics and histograms of the predicted optimal tuning parameters and validation results to monitor the system performance.

In addition, the embodiments for monitoring the data collection may expand beyond the machine learning data for optical transmitters and take the form of a "live listener" component for monitoring the collection and quality of the data. The live listener component, like the machine learning data collection, monitors the data collected in a passive manner, avoiding any delays or shutdowns in a manufacturing system. While the below discussion initially discusses data collection for machine learning purposes, the live listener may involve other types of data, as will be discussed later.

Figure 1:
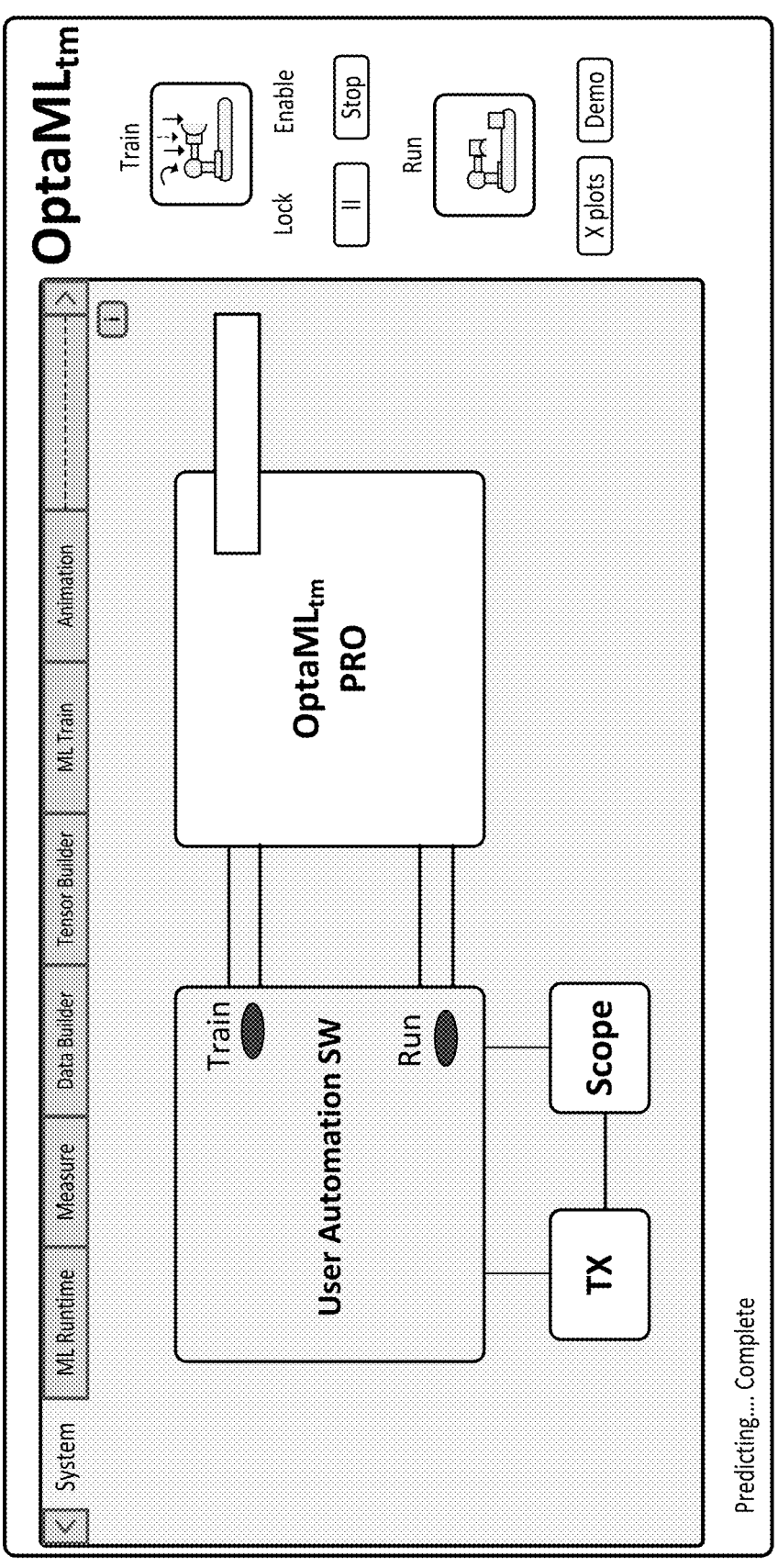
FIG. 1 shows an embodiment of a user interface for a device under test (DUT) tuning software application.

FIG. 1 shows an example of a user interface on a test and measurement instrument within a test and measurement system that includes a manufacturing system and a machine learning system. The user interface refers to the name OptaML Pro, the name of a machine learning optical transmitter tuning software. The term 'manufacturing system' as used herein includes manufacturing systems for electronic devices, such as optical transmitters, and may also be referred to as the 'manufacturing line.' The term 'machine learning system' as used herein includes many different architectures of machine learning models, including neural networks. The below discussion focuses on an embodiment that employs a deep learning network, which typically means a network that has an input layer, several hidden layers, and an output layer, but other architectures could be used.

As mentioned above, the examples used to demonstrate the embodiments focus on testing of optical transmitters. In FIG. 1 the System tab menu depicts the high-level view of the overall optical tuning system. It is simplified down to four blocks consisting of: User Test Automation SW, TX, Scope, and OptaML Pro. User Test Automation SW in this example refers to the manufacturing system software that controls the user's manufacturing line. It controls ovens, optical switches, instruments, and the machine learning system. TX refers to the transmitter to be tuned, and Scope refers to the oscilloscope used to capture the waveforms. One should note that the test and measurement instrument may be an oscilloscope as in this example, or it may be different types of test equipment in other examples.

The machine learning system requires a training period in which the customer and maybe an engineer, or the customer's system, collects the data, formats, and store the data needed for training the neural networks to make tuning parameter predictions based on input waveforms from the transmitter.

In an overview of the system in the embodiment involving optical transmitters, once the neural networks are trained then the User Automation SW will be required to store three sets of reference parameters in transmitters to be tuned, and collect three waveforms, one for each tuning. These three waveforms will go into the tensor builder block, discussed in FIG. 3, which will create an RGB image representation of pruned data within the acquired waveforms. This will be input to the neural networks and a set of optimal tuning parameters for the transmitter will be output from the neural networks.

The User Automation SW will then load the transmitter with the predicted tuning parameters and control the scope to acquire one waveform. The system will then test the waveform with measurements such as TDECQ (transmitter dispersion eye closure quaternary), OMA (optical modulation amplitude), and others to determine pass or fail. The discussion may refer to this as 'validation.'

If the ML prediction fails, meaning the optical transmitter operating with predicting tuning parameters does not pass, then the system makes it easier for the user to run their 'conventional' tuning algorithm to attempt tuning. If that fails, then the device is rejected.

Figure 2:
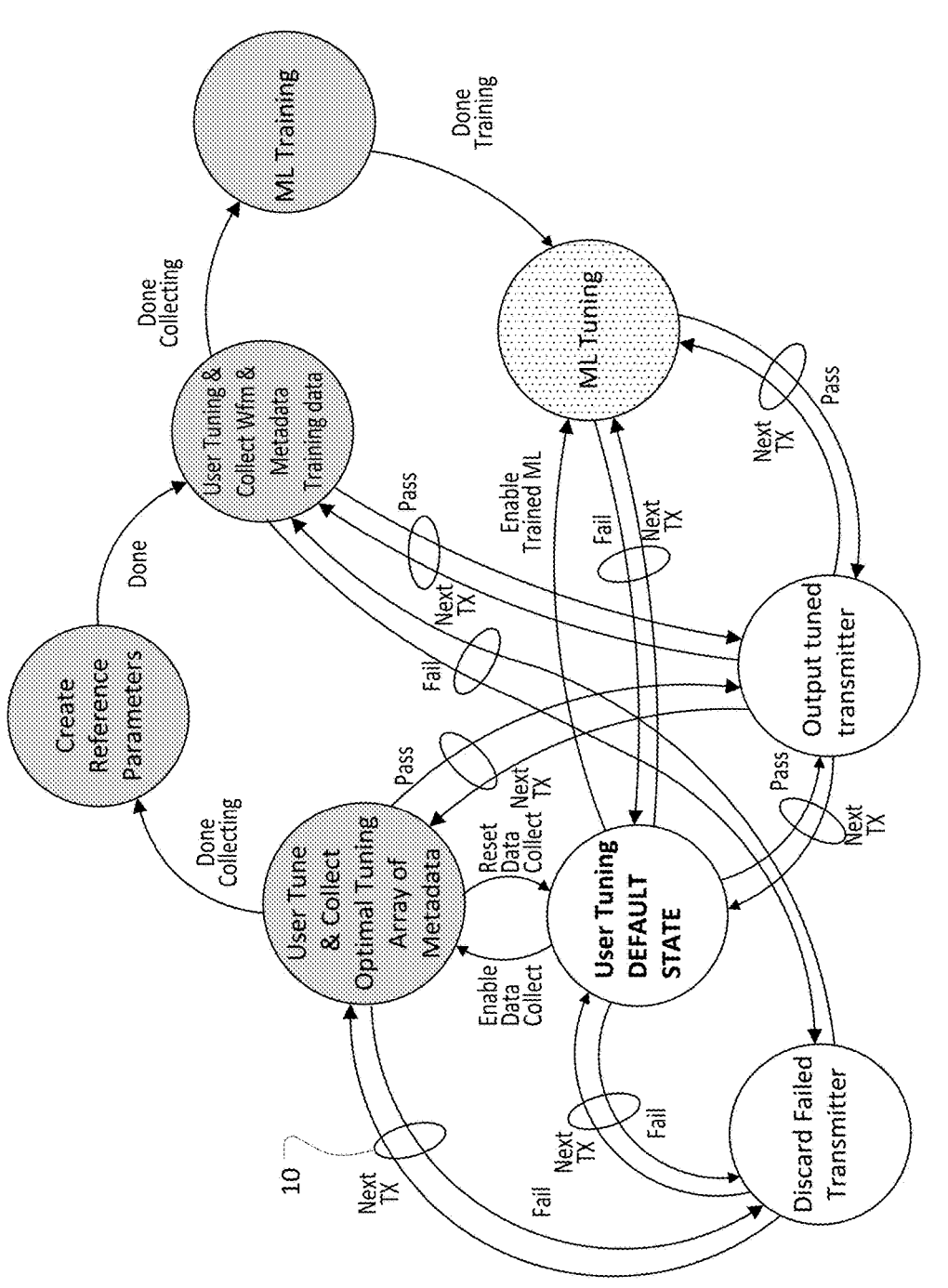
FIG. 2 shows a state diagram for an embodiment of a method of collecting data and training a machine learning system.

FIG. 2 shows a state diagram of the various states within the system. The states represent states that occur on the manufacturing line of the user as it tunes optical transmitters to prepare for shipping them. The DEFAULT STATE in the state transition diagram represents the state in which the user's own tuning algorithm tunes the transmitters. The system would use this process if the machine learning application were not in use. The gray states are different states required to maintain user tuning but at the same time go thru several states of collecting and setting up data for tuning. The dotted ML Tuning state is used to replace the user tuning state to speed up the tuning process by 75 times, nominally. As shown here the manufacturing system still uses the user tuning algorithm during the time that waveform and metadata tuning data is being collected. The system logic is designed such that the User Automation SW can select at any time to operate only in this state.

In the User Tuning & Collect Optimal Tuning Array of Metadata state, each time the user tuning algorithm tunes a transmitter, the system collects the optimal tuning parameters into an array of optical tuning parameters structures.

The system enters the Create Reference Parameters state when the previous state above has collected enough optimal tuning samples. The array of optimal tuning data is averaged to get a meanPar reference parameter set. The system derives other sets from the meanPar by changing it by some delta to get the deltaPar1 reference parameter set, and by another delta, which may be the opposite of the first delta (+/−) to get the deltaPar2 reference tuning parameter set. Once these reference parameters have been determined then the system transitions to the next state to collect training waveform data and metadata.

In the User Tuning & Collect Wfm & Metadata Training Data state uses the user's tuning algorithm to tune each transmitter. Upon tuning the transmitter, the system saves the optimal tuning set. In addition, the manufacturing system loads each of three reference parameter sets into the transmitter and collects 5 or so waveforms for each set. This process only slows down the overall manufacturing throughput by roughly 4% and may take around 6.25 days to complete. This process avoids the total shutdown of the manufacturing line.

The ML Training state represents the completion of the data collection and the point where the user or system engineer can use the collected data in the ML application to train the multiple neural networks in the system. Once this training is complete, the system saves the trained model setup and may now use it for predicting optimal tuning parameters, and TDECQ measurements.

The ML Tuning uses the trained model and makes predictions of the optimal tuning parameters for the transmitter. It requires that the User Test Automation SW loads the three-reference parameter sets into the transmitter and gets one waveform for each. It then processes these waveforms thru the tensor builder block shown in FIG. 3 to use as input for the neural networks. The output of the neural networks may be the optimal set of tuning parameters when the system is at that point, or a TDECQ or other measurement value when the system is in that part of the process. As stated above, this state nominally runs 75 times faster than the users default state.

The Output Tuned Transmitter state represents the tasks required to output and process a tuned transmitter that has passed the validation testing. When complete the state transitions back to the state that passed the transmitter, as shown by the ellipses such as 10 in the various send and return paths.

The Discard Failed Transmitter state represents tasks required to process a transmitter that failed to tune. It is a temporary state, and the flow goes back to the state that failed the transmitter when done.

Figure 3:
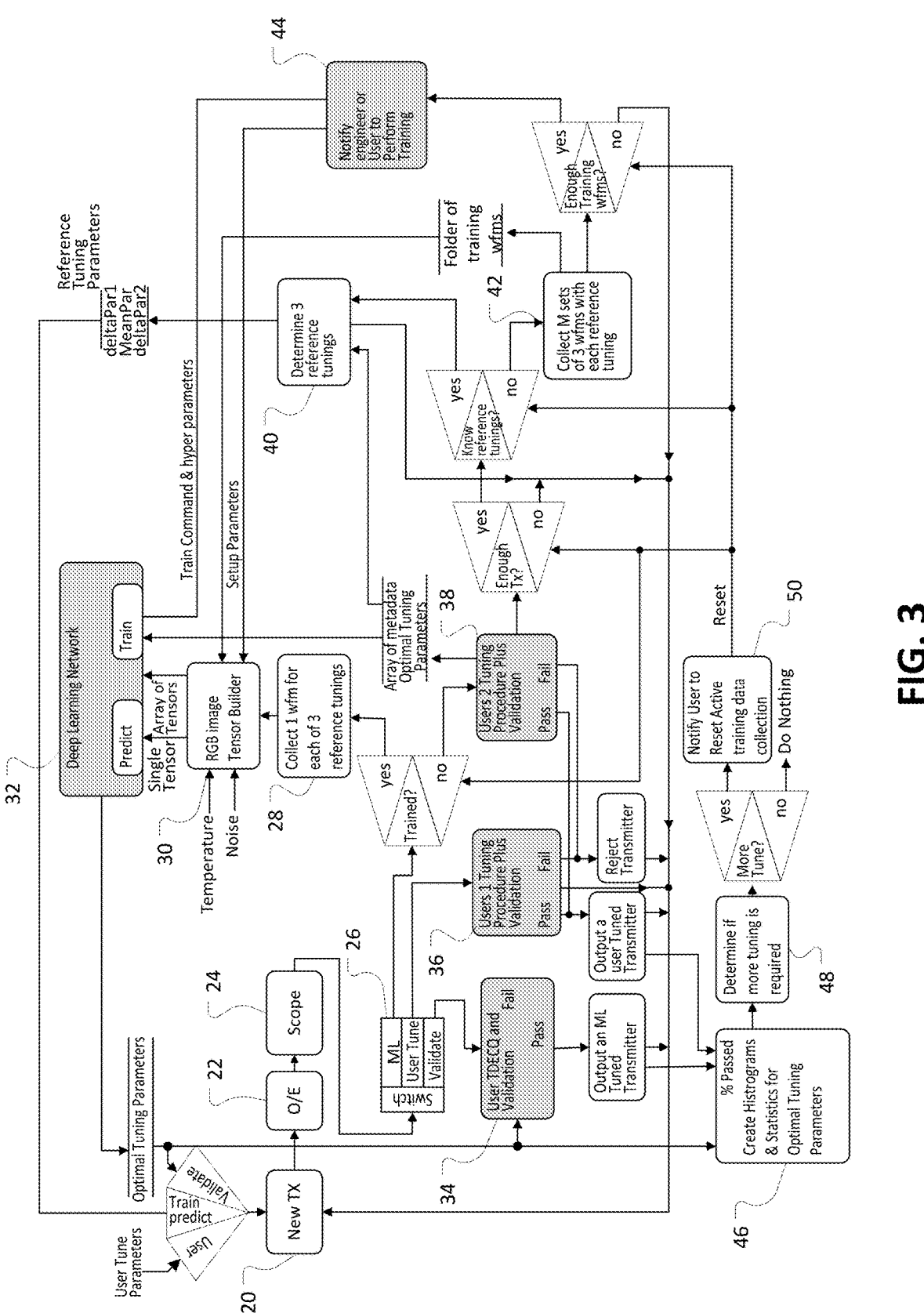
FIG. 3 shows an embodiment of a system to collect neural network training data during a manufacturing cycle without shutting down the manufacturing line.

FIG. 3 shows a more detailed example of the system of the embodiments. FIG. 3 represents the various primary states of the system shown in FIG. 2 by the conditional block that provides the necessary logic to control the state flow transitions. Therefore, each conditional block intends to not only represent the condition that causes state transition but also include the necessary algorithm and code that tests the condition. Control of these states resides with the User Automation SW so that the overall system operates to control processes on the manufacturing line.

Therefore, the system diagram of FIG. 3 facilitates implementation of the state flow diagram shown in FIG. 2. To accomplish this requires the User Automation SW to program the conditional blocks in the system flow diagram required to cause the state transitions to occur. These conditional blocks facilitate using only the user's tuning application or the ML Tuning application. They also facilitate collecting data without stopping the MFG line from tuning transmitters. A nominal 4% slowdown is expected when collecting training data. It will nominally take 14 days to collect data and train.

In the embodiments for an optical transmitter, the first state or stage of data collection so the system can create the three sets of reference tuning parameter sets. For other embodiments, the system may only use one set of reference tuning parameters, or other numbers of reference tuning parameter sets. In the second state, or stage, of collecting data the system loads the reference parameters sets to allow collection of waveforms for use in training. Once the data collection is complete, the next stage involves training the deep learning networks. Once trained, the system moves to the ML Tuning state as a faster way to tune the transmitter rather than by using the User default tuning algorithm. As mentioned above, the system includes a switch of some type that allows the user to select the ML Tuning approach or to return to their Default State.

FIG. 3 shows several components of the overall system and process. The New TX 20 represents each new transmitter that is to be tuned. The new transmitter receives tuning parameters from different states as input. For example, it may receive tuning parameters that are swept when the system operates in one of the states that runs the user's tuning algorithm. The transmitter may receive reference parameters as input when the system is the training state, or when the system is the ML Tuning state. The transmitter may receive a predicted optimal parameter set that it would use when performing validation while it is in the ML Tuning state.

The optical electrical converter (O/E) 22 comprises an optional component, only used when dealing with tuning an optical transmitter.

The scope 24 acquires the electrical signal into memory for processing. As mentioned above, an oscilloscope only represents one possible test and measurement instrument usable here. The switch 26 in communication with the instrument/scope 24 directs the flow of the received waveforms to the appropriate process in the appropriate state. The switch may take the form of a software switch or a hardware switch.

The gray conditional blocks represent conditions for state transitions, and represent the code and algorithms needed to determine the conditions. The Users Automation SW application sets up and controls these blocks.

The block 28 Collect 1 WFM for Each of 3 Reference Tunings makes it clear that three waveforms must be acquired using each of the three-reference parameter tuning settings. These tuning parameter sets are loaded into the TX by the User Automation Application. As stated above, the three reference sets apply to the optical tuning transmitter example of the embodiments. In other examples, the system may use more, or fewer reference parameter sets.

The RGB Image Tensor Builder block 30 receives the three waveforms and processes each one into a different color channel of an RGB image. U.S. patent application Ser. No. 17/747,954, filed May 18, 2022, "SHORT PATTERN WAVEFORM DATABASE BASED MACHINE LEARNING FOR MEASUREMENT," and U.S. patent application Ser. No. 17/592,437, filed Feb. 3, 2022, "EYE CLASSES SEPARATOR WITH OVERLAY, AND COMPOSITE, AND DYNAMIC EYE-TRIGGER FOR HUMANS AND MACHINE LEARNING," discuss the tensor builder and are incorporated herein by reference in their entirety.

The tensor builder 30 may also create monochrome images and may incorporate bar graphs, from parameter input such as noise and temperature, as discussed in U.S. patent application Ser. No. 18/208,562, filed Jun. 12, 2023, "SEPARATING NOISE TO INCREASE MACHINE LEARNING PREDICTION ACCURACY IN A TEST AND MEASUREMENT SYSTEM," incorporated herein by reference in its entirety. The resulting image is used as input to the trained neural networks when predicting tuning parameters, or making performance measurement such as TDECQ is being performed. Arrays of these images are generated from training data and used as input during the training process of the deep learning networks.

The Deep Learning Network 32 represents one or more deep learning networks making up the ML system. These are trained to associate RGB color images of waveforms, or monochrome images, with optimal tuning parameters or with measurements.

User TDECQ and Validation block 34 represents the validation of the predicted tuning parameter set from the ML system. The system loads the set into the transmitter and obtains one waveform. Performing a TDECQ and/or other performance measurements on that waveform determines if the transmitter tuning passed or failed. The output of this block is a tuned transmitter using ML Tuning.

The Users 1 Tuning Procedure Plus Validation block 36 represents using the customers tuning algorithm and validation algorithms without machine learning, in the User Tuning DEFAULT STATE. The output of this state is a tuned transmitter using the customers tuning algorithms. Similarly, the Users 2 Tuning Procedure Plus Validation block 38 represents using the customers tuning algorithm and validation algorithms only. This uses the same tuning algorithm from the User Tuning DEFAULT STATE. One output of this state is a tuned transmitter using the customers tuning algorithms. A second output of this state is the optimal tuned parameters going into an array to collect them for later use in training the deep learning networks.

The block Determine Three Reference Tunings 40 executes when the first stage of training completes from the state User Tuning & Collect Optimal Tuning Array of Metadata shown in FIG. 2. The user must average all the collected tuning parameters in the saved array to create the first reference parameter set meanPar. In one embodiment, the system or user adds a delta amount to parameters in meanPar and to get deltalPar. Adding a different delta to meanPar results in delta2Par.

In the Collect M Sets of 3 Wfms with each Reference Tuning block 42 the value of M typically equals 5. This means that the system must collect 5 sets of three waveforms for each transmitter that is tuned. The three waveforms are obtained by placing the three reference parameter sets into the transmitter and collecting one waveform for each. This results in a total of 15 waveforms from each transmitter to save as training data.

In the Notify Engineer or User to perform Training block 44 the system provides notice to the user or the system engineer running the system indicating the system is ready for training. This means the waveform data collection and the array of metadata will be input to the train input of the deep learning network block. The command plus the hyper parameter values needed for training will be sent to the deep learning network. After training, the network will be ready for use on the manufacturing line for prediction of optimal tuning parameters.

In the Create Histograms & Statistics for Optimal Tuning Parameters block 46 makes histograms of each tuning parameter in the optimal tuning parameter set obtained for each transmitter when it is trained. This data may be for ML tuning only, it may be for user tuning, it may be for combination of both, or both may be kept as separate data. This data may be available for viewing in the UI of the application to monitor performance. This data may also be used to look for trends that would signal to the user that the manufactured components are changing characteristics and a new set of training data may need to be collected and used to retrain the system.

Determine if More Tuning is Required block 48 contains the algorithms used to analyze the statistics from the previous block and then determine if the system needs retraining. If the determination is made that more tuning is required, the block Notify User to Reset Active Training Data Collection 50 sends notice to the User Automation SW to indicate that the system states must be changed to start collection more training data. This would tell the user that they should go and look at the statistical data collected and evaluate what has changed on their MFG line. The user can make the decision to slow down their line by 4% and begin collecting more training data.

Figure 4:
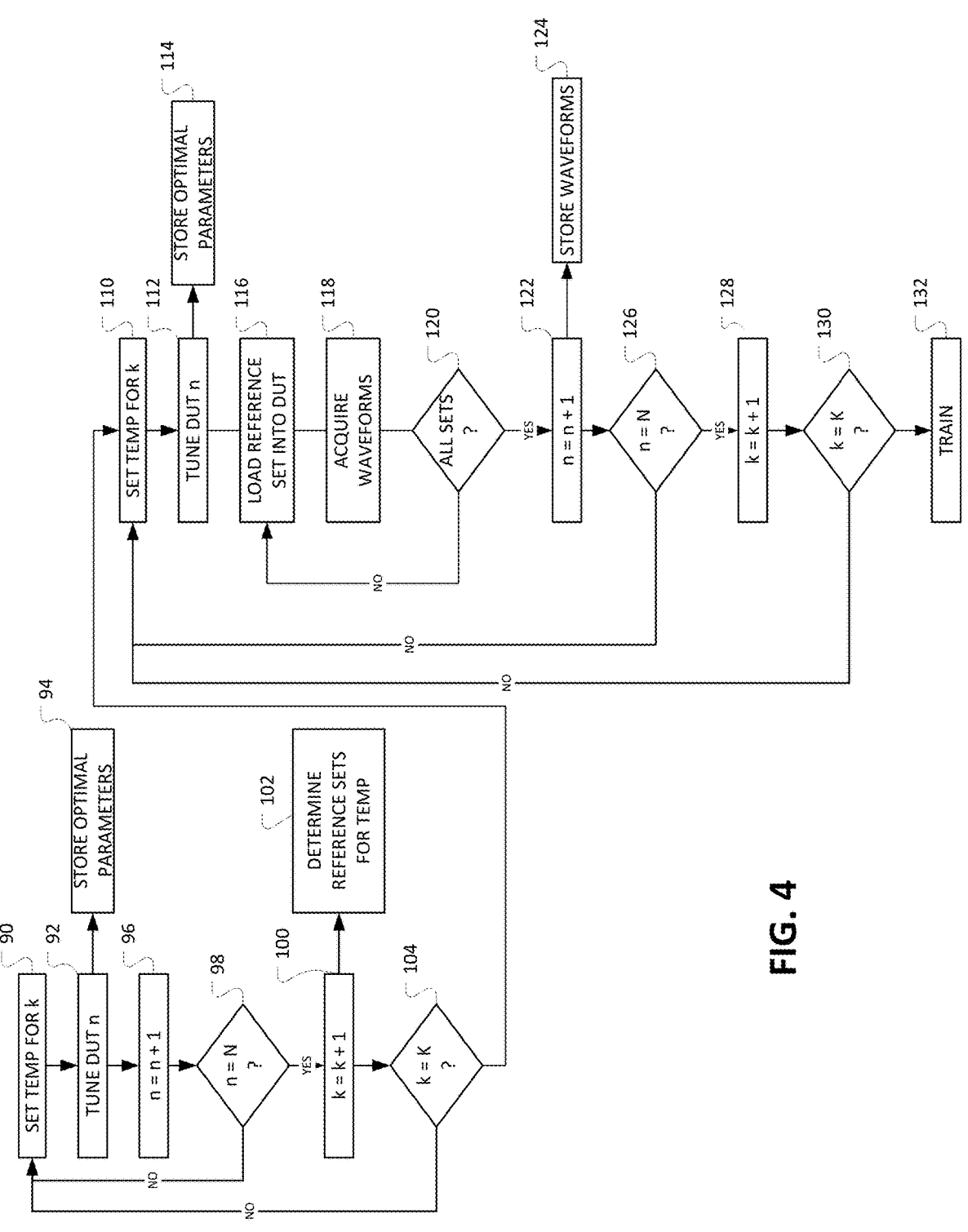
FIG. 4 shows a flow chart of an embodiment of a method of controlling data collection.

FIG. 4 shows an example of a flow chart showing the logic needed for some of the state transition diagram shown in FIG. 2. The process has two parts. Starting at 90, the oven in which the transmitters will be tested is set to a first temperature. The variable, k, defines the number of temperature setting. In one embodiment, the number of temperatures equals 5, so k=5. The transmitter n, or some first set of transmitters, undergoes tuning at 94 using the customer's conventional tuning system. Once tuned, the system stores the optimal parameters for the transmitter at 94. The transmitter count, n, is then incremented at 96. This process continues until the transmitter count n equals the total number of transmitters N at 98. The temperature count k is then incremented, and the process repeats at a new temperature, with the number of transmitters acting as an inner loop. Once all the transmitters are tuned at the current temperature at 100, the system uses the optimal parameters to determine the mean parameter set, meanPar, and the two delta parameters sets, deltaPar1 and deltaPar 2 at 102. Once all the transmitters are tuned for all the temperatures at 104, this part of the process ends. This portion of the process to create the reference parameters sets may take 150 hours, or 6.25 days.

Once the process has completed the development of the reference parameter sets, the system can gather waveforms for each parameter set for a set of transmitters to build the training data set. At 100, the system sets the temperature corresponding to the temperature count k. The transmitter undergoes conventional tuning at 112, and the system stores the optimal parameters at 114. Starting at 116, the process loops through loading the transmitter with the different reference sets at 116, acquiring the waveforms at 118, and then repeating all the waveforms have been acquired for all the reference sets at 120. Once all sets are completed for that DUT, the DUT count increments at 122 and the waveforms are stored at 124. Once all the DUTs are trained at 126, the system sets the temperature to the temperature corresponding to the next count k. The process repeats until all the DUTs have produced waveforms for all the parameter sets at all the temperatures at 130. At this point, the system has enough data to train at 132. This process is estimated to take 150 hours, plus 5 hours, or 6.5 days. During this process, the line will remain functional at 96% of its capacity.

Overall, training the DUTs using the user process takes 2700 seconds, or 45 minutes. Once trained, the model takes on average 40 s.

The embodiments above present a novel method for collecting waveform and metadata for tuning systems using Tektronix patent pending methods for providing three reference parameters sets for optical transmitters, extendable to other devices under test (DUT). The embodiments allow an operating manufacturing line to only be slowed down by 4% while collecting the necessary data to then trigger a training cycle after approximately 14 days of collection time. Once training completes, this system also specifies the necessary conditional logic block to implement a state flow diagram as shown in FIG. 2 and FIG. 3 shows data flow in the system. This gives the user control of states so that they may choose to tune using only their original tuning algorithms, or they may choose to tune using their original algorithms and at the same time collect data for training the deep learning networks of the machine learning system. The user may choose to tune using the deep learning networks after training has completed. If the machine learning tuning fails, then the system facilitates using the customers tuning algorithms for one last try to tune the transmitter. This system also contains blocks representing collection of tuning statistics and algorithms that look at the statistics and determine if shifts in the manufactured device characteristics are occurring to a degree that requires starting a new training cycle.

The various blocks and algorithms discussed above may take the form of executable code running on one or more processors. The processors may reside in the user manufacturing system, the test and measurement instrument such as the oscilloscope, or in a separate computing device that contains the machine learning system, distributed between two of the three, or all three.

As mentioned above, the module that monitors and analyzes the data collection system may expand beyond the data collection for the tuning system discussed above. The below discussion refers to this as a "live listener." The embodiments ease the burden of data collection by automating the process with minimal to no interruption in their existing processes. The embodiments ensure collection of enough data and ensure that data is of high quality. The live listener module comprises a time query module, a progress monitor, a statistical analysis module, and an automated feedback module based on the statistical analysis.

Figure 5:
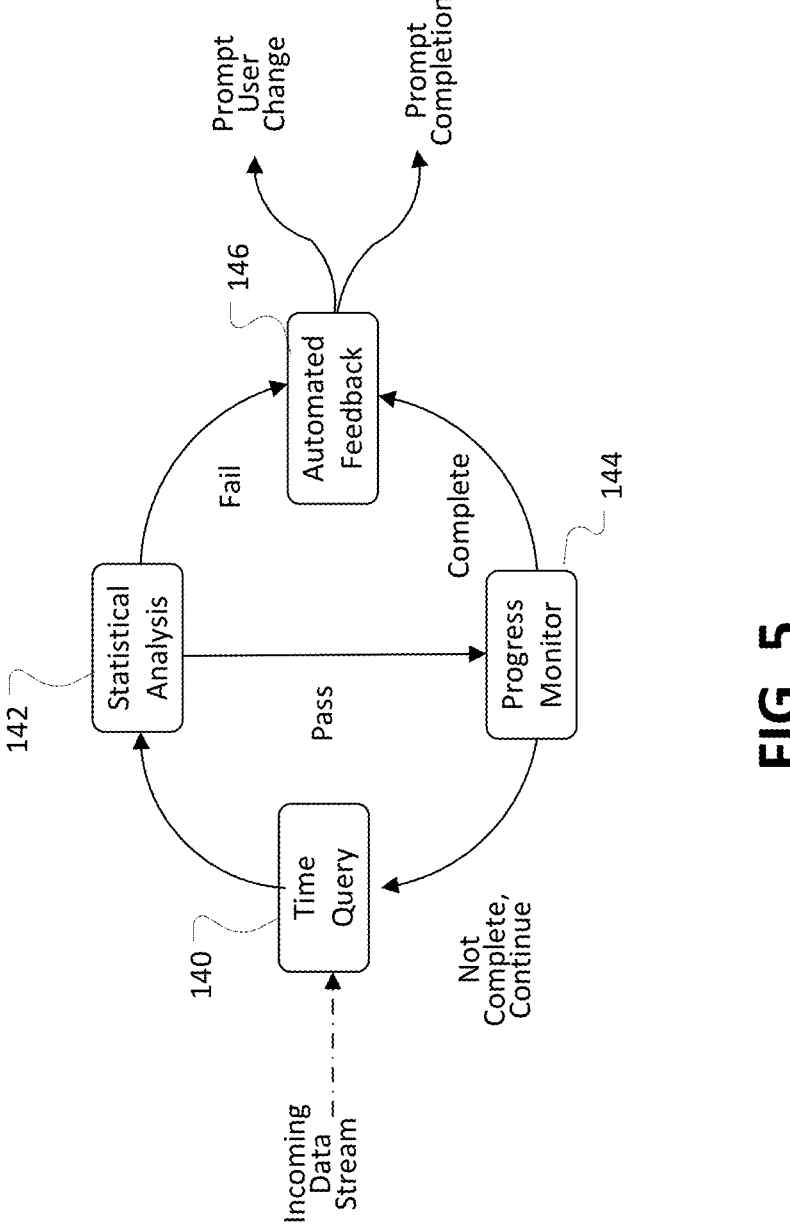
FIG. 5 shows an embodiment of a live listener tool methodology.

A core design for such a "live listener," according to an example embodiment of the disclosure, is shown below in FIG. 5. A collection goal, timer interval and desired statistical analyses will be determined based on the desired outcome of the user. The timer will periodically query the data save location at 140 to obtain newly arrived data since last analysis. If collected data meets the statistical criteria at 142, the loop will continue until reaching the predetermined collection goal at 144, then prompting the user to stop collection at 146. If the data does not meet the desired criteria, it will automatically diagnose, based on the analysis, and prompt the user to update the live session setup at 146.

Figure 6:
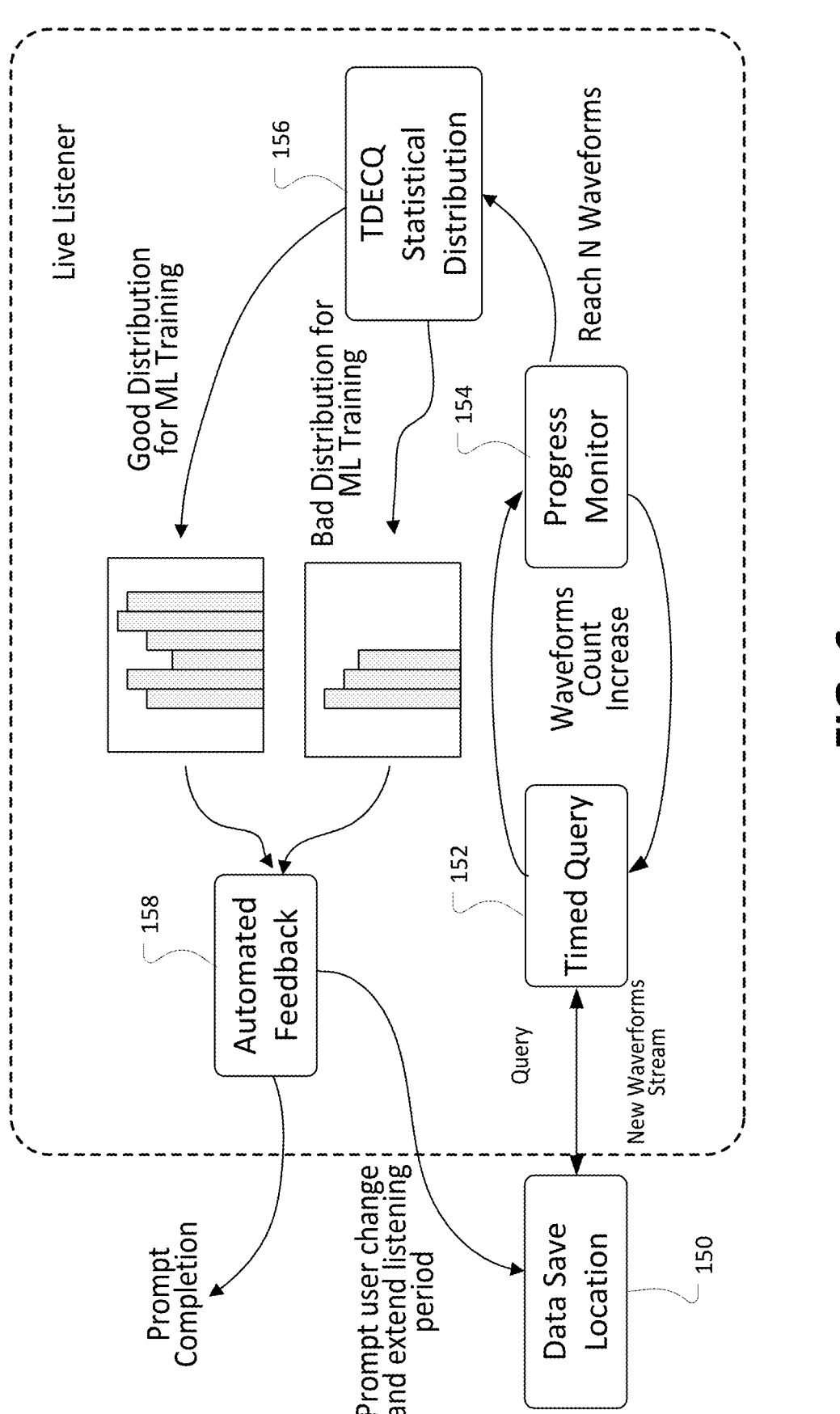
FIG. 6 shows an embodiment of a workflow for a live listener in a method of collecting machine learning training waveforms for a performance measurement.

According to various embodiments of the disclosure, some non-exclusive examples of use cases for such a live listener module include the following. In a first example, collecting large dataset from real devices under test (DUTs) is often a prerequisite to build reliable machine learning algorithms, as discussed in the embodiments above. It often becomes a big burden for customers. Customers may have to take their production line down, and they may not understand whether the training data they have collected is of good quality. Some embodiments of the disclosure can solve this customer issue. Using the example of using machine learning to measure Transmitter Dispersion Eye Closure Quaternary (TDECQ) for optical transceivers or transmitters, FIG. 6 illustrates a workflow according to some embodiments of the disclosure. One should note that other types of performance measures for other types of DUTs may also use this system.

The user provides a data save location 150 where the listener can query on the timer at 152, with each new addition of waveforms, the progress monitor 154 slowly reaches the goal of receiving N training waveform files. After the goal is reached, the system measures TDECQ, or other performance measure, of a randomly sampled subset at 156 and constructs a statistical distribution. Based on the distribution, the listener will either prompt the user to collect more data within certain range of TDECQ, or prompt completion if the distribution is satisfactory at 158.

Figure 7:
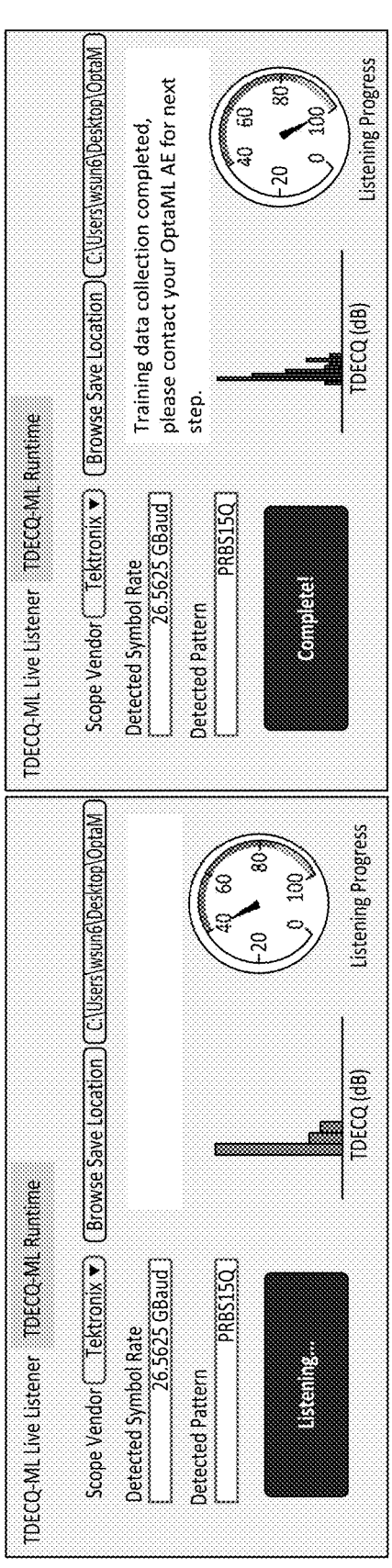
FIG. 7 shows an embodiment of a user interface for a live listener tool.

FIG. 7 illustrates an example user interface for a live listener module, implemented in Matlab in this example, although other programs could be used.

The workflow described above can be suited for many other machine learning training data collection processes with limited modifications. This provides a blueprint for a low profile, low interruption way of collecting training data for future ML projects.

Figure 8:
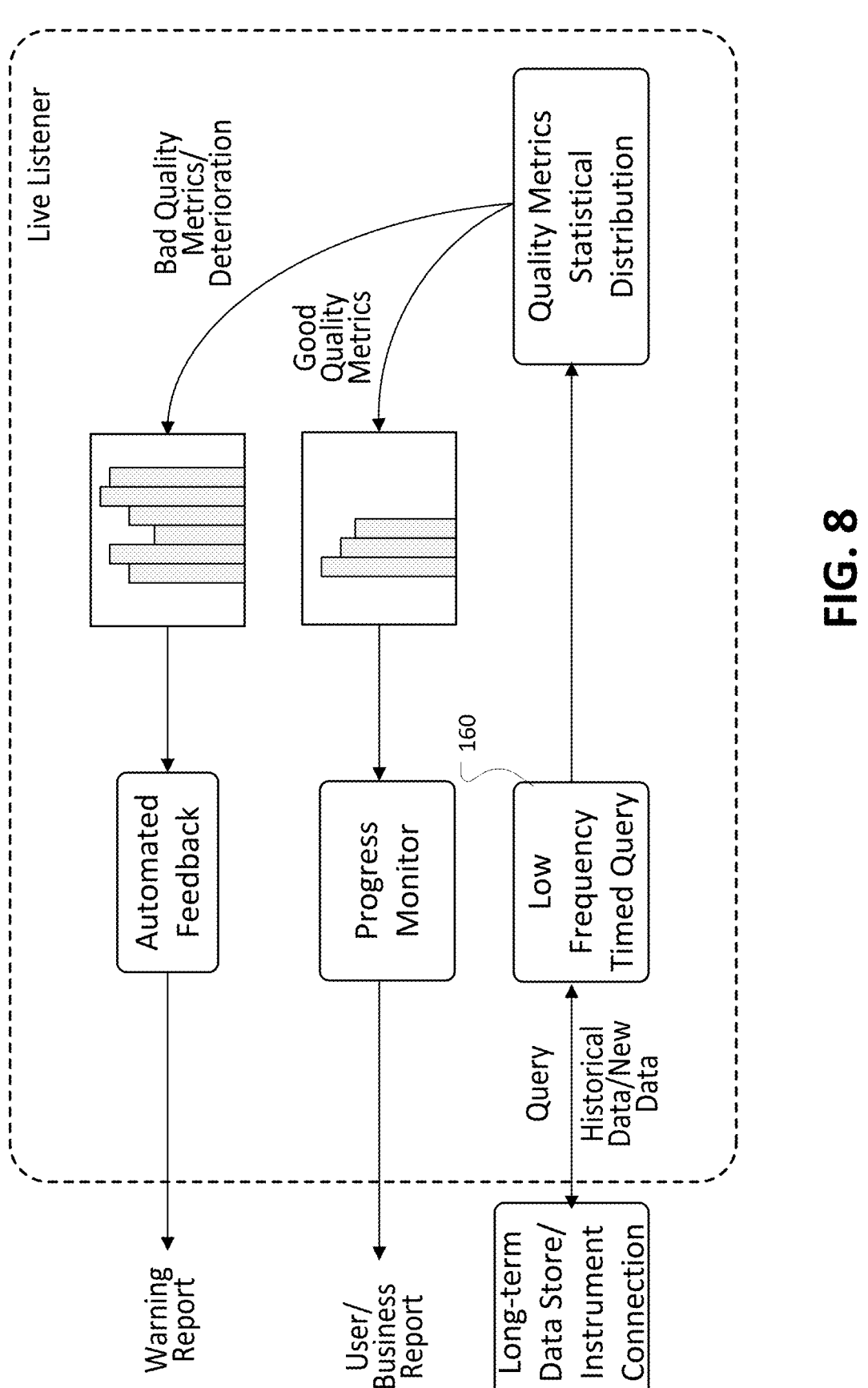
FIG. 8 shows an embodiment of a method of using live listener to retrain a machine learning system.

According to other embodiments, the capabilities described above can expand into a more long-term monitoring use case. Instead of using the listener for specific incidents of data collection, customers can link the listener into their long-term data store or live testing instruments. The data store or live testing instruments will be referred to herein as data sources. The listener will passively query at a reduced frequency and provide quality metrics statistical analysis for historical data, and/or live data. It can generate long term manufacturing health report of the user/business. It can also automatically generate warnings when it detects any bad batch of products or long-term deterioration of the station similar to FIG. 6. FIG. 8 shows an example of this process, which is similar to FIG. 6, except that the timer 152 of FIG. 6 becomes a long-term, low-frequency, time at 160.

In a typical support case, and that an Applications/Systems Engineer (AE) or other member requests data to replicate the problem or to confirm the proposed solution is working and is effective. It can be difficult to get the correct data for both cases as the party on both sides may be different than those who found the issue. According to some embodiments, using the live listener in conjunction with similar remote assistance tools would allow the engineer to have deeper understanding of the root cause of the issue. One possibility involves the engineer remote into the customer's system and points the Live Listener at the affected areas. This allows the engineer to determine the quality of data being produced. They can then compare historical norms, simulated expected results, or some other golden reference to diagnose the issue quicker.

According to still other embodiments of the disclosure, some of the metadata saved from the live listener, in compliance with GPDR, EULA, and other regulations, can also include the Type of Device Under Test, Quality of Data (TDECQ or other metric), Amount of Data Tested, Highs and Lows of the data set and other statistical models, as well as configuration of the set up (test equipment vendor/models/serial numbers/etc., cables, probes, etc.). This data can be used to generate/enhance Predictive Interoperability modeling where either known good states or bad states could be shown to the customer giving them confidence in their set up or preemptively averting issues with compatibility. For instance, if a Live Listener deploys onto two or more manufacturing lines both performing similar tasks, it would be possible to compare the configurations and quality of testing for the benefits of both lines.

Aspects of the disclosure may operate on a particularly created hardware, on firmware, digital signal processors, or on a specially programmed general purpose computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

The previously described versions of the disclosed subject matter have many advantages that were either described or would be apparent to a person of ordinary skill. Even so, these advantages or features are not required in all versions of the disclosed apparatus, systems, or methods.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

EXAMPLES

Illustrative examples of the disclosed technologies are provided below. An embodiment of the technologies may include one or more, and any combination of, the examples described below.

Example 1 is a test and measurement system, comprising: a test and measurement instrument configured to receive waveform data from a device under test (DUT) on a manufacturing line; a machine learning system connected to the test and measurement instrument; and one or more processors configured to execute code that causes the one or more processors to: collect optimal tuning parameter data sets from the DUT after the DUT is tuned on the manufacturing line; determine one or more parameter data sets from the optimal tuning parameter data; load the one or more parameter data sets into the DUT; collect waveform data from the DUT for the one or more parameter data sets as training data sets; train the machine learning system using the training data sets; and use the machine learning system after training to produce an output related to the DUT.

Example 2 is the test and measurement system as claimed in claim 1, further comprising a switch configured to select between the DUT being tuned by the manufacturing line, the DUT being tuned by the machine learning system, and the DUT being validated.

Example 3 is the test and measurement system of either of Examples 1 or 2, wherein the code that causes the one or more processors to determine one or more parameter data sets comprises code that causes the one or more processors to determine a mean parameter set, and to derive at least one additional parameter data set from the mean parameter data set.

Example 4 is the test and measurement system of Examples 1 through 3, wherein the output related to the DUT comprises one of a validation measurement or a predicted optimal tuning parameter set.

Example 5 is the test and measurement system of Examples 1 through 4, wherein the one or more processors are further configured to execute code that causes the one or more processors to monitor data collection of at least one of the optimal tuning parameter data sets and the waveform data from the DUT.

Example 6 is the test and measurement system of Example 5, wherein the code that causes the one or more processors to monitor data collection causes the one or more processors to generate histograms of each tuning parameter in the optimal tuning parameter sets.

Example 7 is the test and measurement system of Example 6, wherein the code that causes the one or more processors to generate histograms of each tuning parameter comprises code to cause the one or more processors to analyze the histograms to determine if the machine learning system needs more training.

Example 8 is the test and measurement system of Examples 1 through 7, wherein the one or more processors are further configured to monitor data collection by executing code that causes the one or more processors to: query a location at which the data is stored; analyze newest data stored in the location; and continue collection of data when the newest optimal tuning parameter data meets one or more criteria.

Example 9 is the test and measurement system of Example 8, wherein the one or more processors are further configured to execute code that causes the one or more processors to: diagnose a cause of the data not meeting the one or more criteria; and provide an update to a user to update the collection of the data.

Example 10 is the test and measurement system of Example 9, wherein the one or more processors are further configured to notify a user when the machine learning system needs more training.

Example 11 is the test and measurement system of Examples 1 through 9, wherein the code that causes the one or more processors to collect waveform data from the DUT comprises code to cause the one or more processors to notify a user when enough waveform data has been collected to allow the machine learning system to be trained.

Example 12 is the test and measurement system of Examples 1 through 11, wherein the one or more processors reside in the test and measurement instrument, a computing device on the manufacturing line, the machine learning system, or any combination thereof.

Example 13 is a method of collecting and using data for a machine learning system, comprising: collecting optimal tuning parameter data sets from a device under test (DUT) after the DUT is tuned on a manufacturing line; determining one or more parameter data sets from the optimal tuning parameter data; loading the one or more parameter data sets into the DUT; collecting waveform data from the DUT for the one or more parameter data sets as training data sets; training the machine learning system using the training data sets; and using the machine learning system after training to produce an output related to the DUT.

Example 14 is the method of Example 13, wherein determining the one or more parameter data sets comprises determining a mean parameter set and deriving at least one additional parameter data set from the mean parameter data set.

Example 15 is the method of either of Examples 13 or 14, wherein the output related to the DUT comprises one of a validation measurement or a predicted optimal tuning parameter set.

Example 16 is the method of claim 13, further comprising monitoring data collection of at least one of the optimal tuning parameter data sets and the waveform data from the DUT.

Example 17 is a method of monitoring data collected in a system, comprising: periodically querying a data source in a system used for testing devices under test (DUT); performing statistical analysis on newly added data at the data source; and producing an output identifying any issues with the data.

Example 18 is the method of Example 17, wherein the data source comprises at least one of a data store and a test and measurement instrument.

Example 19 is the method of either Examples 17 or 18, wherein the data source is a store used to collect waveform data for use as training data in a machine learning system.

Example 20 is the method of any of Examples 17 through 19, wherein the output identifies at least one of having enough data for training a machine learning system, recent data showing multiple DUT failures in testing, and a need for more data within a particular performance measurement range.

Although specific examples of the invention have been illustrated and described for purposes of illustration, it will be understood that various modifications may be made without departing from the spirit and scope of the invention. Accordingly, the invention should not be limited except as by the appended claims.

We claim:

1. A test and measurement system, comprising:
   a test and measurement instrument configured to receive waveform data from a device under test (DUT) on a manufacturing line;
   a machine learning system connected to the test and measurement instrument;
   one or more processors configured to execute code that causes the one or more processors to:
   collect optimal tuning parameter data sets from the DUT after the DUT is tuned on the manufacturing line;

determine one or more parameter data sets from the optimal tuning parameter data sets;

load the one or more parameter data sets into the DUT;

collect the waveform data from the DUT for the one or more parameter data sets as training data sets;

train the machine learning system using the training data sets; and use the machine learning system after training to produce an output related to the DUT; and a switch configured to select between the DUT being tuned by the manufacturing line, the DUT being tuned by the machine learning system, and the DUT being validated.

2. The test and measurement system as claimed in claim 1, wherein the code that causes the one or more processors to determine one or more parameter data sets comprises code that causes the one or more processors to determine a mean parameter data set, and to derive at least one additional parameter data set from the mean parameter data set.

3. The test and measurement system as claimed in claim 1, wherein the output related to the DUT comprises one of a validation measurement or a predicted optimal tuning parameter set.

4. The test and measurement system as claimed in claim 1, wherein the one or more processors are further configured to execute code that causes the one or more processors to monitor data collection of at least one of the optimal tuning parameter data sets and the waveform data from the DUT.

5. The test and measurement system as claimed in claim 4, wherein the code that causes the one or more processors to monitor data collection causes the one or more processors to generate histograms of each tuning parameter in the optimal tuning parameter sets.

6. The test and measurement system as claimed in claim 5, wherein the code that causes the one or more processors to generate histograms of each tuning parameter comprises code to cause the one or more processors to analyze the histograms to determine if the machine learning system needs more training.

7. The test and measurement system as claimed in claim 1, wherein the one or more processors are further configured to monitor data collection by executing code that causes the one or more processors to:

query a location at which the data is stored;

analyze newest data stored in the location; and continue collection of data when the newest optimal tuning parameter data meets one or more criteria.

8. The test and measurement system as claimed in claim 7, wherein the one or more processors are further configured to execute code that causes the one or more processors to:

diagnose a cause of the data not meeting the one or more criteria; and provide an update to a user to update the collection of the data.

9. The test and measurement system as claimed in claim 8, wherein the one or more processors are further configured to notify a user when the machine learning system needs more training.

10. The test and measurement system as claimed in claim 1, wherein the code that causes the one or more processors to collect the waveform data from the DUT comprises code to cause the one or more processors to notify a user when enough of the waveform data has been collected to allow the machine learning system to be trained.

11. The test and measurement system as claimed in claim 1, wherein the one or more processors reside in the test and measurement instrument, a computing device on the manufacturing line, the machine learning system, or any combination thereof.

12. A method of collecting and using data for a machine learning system, comprising:

collecting optimal tuning parameter data sets from a device under test (DUT) after the DUT is tuned on a manufacturing line;

determining one or more parameter data sets from the optimal tuning parameter data;

loading the one or more parameter data sets into the DUT;

collecting waveform data from the DUT for the one or more parameter data sets as training data sets;

training the machine learning system using the training data sets;

using the machine learning system after training to produce an output related to the DUT; and operating a switch to select between the DUT being tuned by the manufacturing line, the DUT being tuned by the machine learning system, and the DUT being validated.

13. The method as claimed in claim 12, wherein determining the one or more parameter data sets comprises determining a mean parameter data set and deriving at least one additional parameter data set from the mean parameter data set.

14. The method as claimed in claim 12, wherein the output related to the DUT comprises one of a validation measurement or a predicted optimal tuning parameter set.

15. The method as claimed in claim 12, further comprising monitoring data collection of at least one of the optimal tuning parameter data sets and the waveform data from the DUT.

* * * * *